United States Patent
Park et al.

(10) Patent No.: US 12,149,155 B2
(45) Date of Patent: *Nov. 19, 2024

(54) APPARATUS AND METHOD FOR MEASURING LOW LOAD CURRENT

(71) Applicant: Samsung Electronics Co., Ltd., Suwon-si (KR)

(72) Inventors: Min Sang Park, Yongin-si (KR); Dongjin Keum, Seoul (KR); Byoungmook Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/517,508

(22) Filed: Nov. 22, 2023

(65) Prior Publication Data

US 2024/0088774 A1 Mar. 14, 2024

Related U.S. Application Data

(63) Continuation of application No. 17/569,075, filed on Jan. 5, 2022, now Pat. No. 11,863,056.

(30) Foreign Application Priority Data

Feb. 25, 2021 (KR) ........................ 10-2021-0025965

(51) Int. Cl.
 *H02M 3/158* (2006.01)
 *H02M 1/00* (2006.01)
 *H02M 3/157* (2006.01)

(52) U.S. Cl.
 CPC ......... *H02M 1/0009* (2021.05); *H02M 3/157* (2013.01); *H02M 3/158* (2013.01)

(58) Field of Classification Search
 CPC ......................... H02M 1/0009; H02M 1/0032
 See application file for complete search history.

(56) References Cited

U.S. PATENT DOCUMENTS

| 8,269,570 | B2 | 9/2012 | Li et al. |
| 9,219,414 | B2 | 12/2015 | Shao |
| 9,831,863 | B2 | 11/2017 | Nene et al. |
| 10,205,388 | B2 | 2/2019 | Choi et al. |

(Continued)

FOREIGN PATENT DOCUMENTS

KR 10-2016-0045954 A 4/2016

*Primary Examiner* — Alex Torres-Rivera
(74) *Attorney, Agent, or Firm* — Harness, Dickey & Pierce, P.L.C.

(57) ABSTRACT

An apparatus configured to measure a load current provided to a load of a switching converter includes a pulse generation circuit configured to generate a control pulse based on a power switch driving signal of the switching converter, a reference current generation circuit configured to generate a reference current based on the control pulse, a clock generation circuit configured to generate a clock signal based on the control pulse and the reference current, and a clock counter configured to count the number of cycles of the clock signal during a switching period of the switching converter. The reference current generation circuit is configured to adjust the reference current to compensate for a leakage current generated in the clock generation circuit during the switching period.

6 Claims, 15 Drawing Sheets

(56) References Cited

U.S. PATENT DOCUMENTS

| | | |
|---|---|---|
| 2015/0364995 A1 | 12/2015 | Chen |
| 2016/0065062 A1* | 3/2016 | Teh ...................... H02M 3/157 |
| | | 323/283 |
| 2018/0159539 A1 | 6/2018 | Tseng et al. |
| 2018/0190360 A1 | 7/2018 | Seo |
| 2019/0157975 A1* | 5/2019 | Vanin ...................... H03K 7/08 |
| 2020/0136510 A1 | 4/2020 | Nam |
| 2020/0136598 A1 | 4/2020 | Nam |

* cited by examiner

APPARATUS AND METHOD FOR MEASURING LOW LOAD CURRENT

CROSS-REFERENCE TO RELATED APPLICATION

This application is a continuation of U.S. patent application Ser. No. 17/569,075, filed on Jan. 5, 2022, which is based on and claims priority under 35 U.S.C. § 119 to Korean Patent Application No. 10-2021-0025965, filed on Feb. 25, 2021, in the Korean Intellectual Property Office, the disclosure of each of which is incorporated by reference herein in its entirety.

BACKGROUND

The inventive concepts relate to a switching converter, and more particularly, to an apparatus and method for measuring a small amount of load current that is difficult to measure by using an analog method.

A switching converter may be used to generate a supply voltage for providing power to various electronic components (e.g., a load) due to its higher power efficiency, and the load may operate by consuming a load current provided by the switching converter. In recent years, a switching converter may be advantageous to not only more stably generate a supply voltage despite the fluctuation of a load current, but also generate information about power consumption of a load. For example, the information about a load current may be used in various ways of, for example, estimating power consumption and/or remaining battery level of the load or reducing or preventing overheating. For example, the information about a load current may be relevant in applications requiring higher power efficiency, such as mobile applications using batteries as power sources. However, it may be more difficult to measure a load current having a smaller magnitude.

SUMMARY

The inventive concepts provide an apparatus and method for more accurately measuring a load having a smaller magnitude, which may be more difficult to measure.

According to an aspect of the inventive concepts, there is provided an apparatus configured to measure a load current provided to a load of a switching converter. The apparatus includes a pulse generation circuit configured to generate a control pulse based on a power switch driving signal of the switching converter, a reference current generation circuit configured to generate a reference current based on the control pulse, a clock generation circuit configured to generate a clock signal based on the control pulse and the reference current, and a clock counter configured to count the number of cycles of the clock signal during a switching period of the switching converter. The reference current generation circuit is configure to adjust the reference current to compensate for a leakage current generated in the clock generation circuit during the switching period.

According to another aspect of the inventive concepts, there is provided a switching converter configured to generate an output voltage from an input voltage. The switching converter includes an inductor and an output capacitor connected to an output node from which the output voltage is generated, a first power switch and a second power switch configured to provide an inductor current to the inductor, a switch driver configured to generate a power switch driving signal for controlling the first power switch and the second power switch, and a load current meter configured to measure a load current provided to a load of the switching converter. The load current meter is configure to generate a control pulse based on a power switch driving signal of the switching converter, is configure to generate a reference current based on the control pulse, is configure to control the reference current to compensate for a leakage current generated in a clock generation circuit, is configure to generate a clock signal corresponding to the load current based on the control pulse and the reference current, and is configure to count the number of cycles of the clock signal during a switching period of the switching converter.

According to another aspect of the inventive concepts, there is provided a method of measuring a load current to be provided to a load of a switching converter. The method includes generating a control pulse based on a power switch driving signal of the switching converter, generating a reference current based on the control pulse, generating a clock signal based on the control pulse and the reference current, and counting the number of cycles of the clock signal during a switching period of the switching converter. The generating of the reference current includes adjusting the reference current to compensate for a leakage current caused in the generating of the clock signal during the switching period.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF SOME EMBODIMENTS

Figure 1:
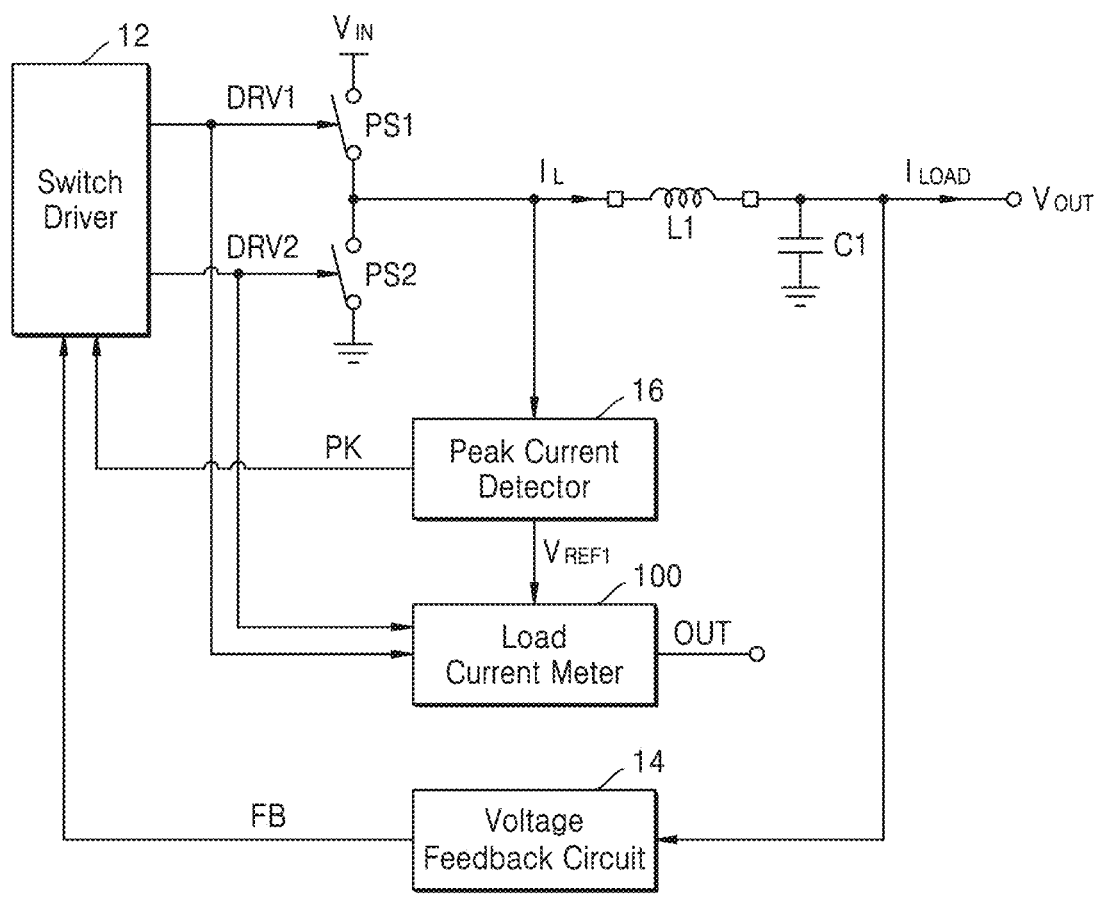
FIG. 1 is a block diagram of a switching converter according to example embodiments.

FIG. 1 is a block diagram of a switching converter 10 according to example embodiments.

As shown in FIG. 1, the switching converter 10 may include an inductor L1, an output capacitor C1, a first power switch PS1, a second power switch PS2, a switch driver 12, a voltage feedback circuit 14, and/or a load current meter 100. In some example embodiments, components of the switching converter 10 may be included in one semiconductor package. In some example embodiments, the switching converter 10 may include a printed circuit board (PCB), and at least two of components of the switching converter 10 may be mounted as separate semiconductor packages, respectively, on the PCB.

Referring to FIG. 1, the switching converter 10 may receive an input voltage $V_{IN}$ and generate an output voltage $V_{OUT}$. The output voltage $V_{OUT}$ may be used as a supply voltage for other electronic components (e.g., a load), and the switching converter 10 may provide a load current LOAD to the load. The switching converter 10 may refer to an arbitrary electronic circuit configured to switch an apparatus on or off and generate the output voltage $V_{OUT}$ and be also referred to as a switching regulator. For example, the first power switch PS1 and the second power switch PS2 of the switching converter 10 may be turned on or off based on a first driving signal DRV1 and a second driving signal DRV2, which are provided by the switch driver 12. In some example embodiments, the first power switch PS1 may include a p-type field effect transistor (PFET) as a power transistor and be turned on in response to the first driving signal DRV1 that is at a low level. In some example embodiments, the second power switch PS2 may include an n-type FET (NFET) as a power transistor and be turned on in response to the second driving signal DRV2 that is at a high level. In some example embodiments, the second power switch PS2 may be replaced by a diode having an anode to which a ground potential is applied and a cathode connected to the inductor L1. Herein, the first driving signal DRV1 will be assumed to be an active-low signal, and the second driving signal DRV2 will be assumed to be an active-high signal.

As used herein, an on state of a switch (or a power switch) may refer to a state in which both ends of the switch are electrically connected to each other, and an off state of the switch may refer to a state in which both ends of the switch are electrically disconnected from each other. In addition, at least two components electrically connected to each other via a switch, which is in the on state, and/or a conducting wire may be referred to as being simply connected to each other, while at least two components electrically connected to each other at all times through a conducting wire may be referred to as being coupled to each other.

In some example embodiments, the input voltage $V_{IN}$ and the output voltage $V_{OUT}$ may be positive direct-current (DC) voltages, and the switching converter 10 may be a DC-to-DC converter. For example, the switching converter 10 may be a buck converter and generate an output voltage $V_{OUT}$ lower than an input voltage $V_{IN}$. The switching converter 10 may be also referred to as a step-down converter. Also, the switching converter 10 may be a boost converter and generate an output voltage $V_{OUT}$ higher than an input voltage $V_{IN}$. The switching converter 10 may be also referred to as a step-up converter. In addition, the switching converter 10 may be a buck-boost (or step-up/down) converter and generate an output voltage V OUT lower or higher than an input voltage $V_{IN}$. Hereinafter, although the switching converter 10 will mainly be described with reference to a buck converter, it will be understood that example embodiments may be applied not only to other types of DC-to-DC converters but also to alternating-current (AC)-to-DC converters configured to receive AC voltages.

The voltage feedback circuit 14 may compare the output voltage $V_{OUT}$ with a target voltage and provide a feedback signal FB indicating a comparison result to the switch driver 12. For example, the voltage feedback circuit 14 may compare the output voltage $V_{OUT}$ or a voltage divided from the output voltage $V_{OUT}$ with at least one reference voltage and generate the feedback signal FB indicating the comparison result. The switch driver 12 may detect a level of the output voltage VOUT based on the feedback signal FB. In some example embodiments, the voltage feedback circuit 14 may generate an activated feedback signal FB, when the output voltage $V_{OUT}$ or the voltage divided from the output voltage $V_{OUT}$ is lower than the reference voltage, and the switch driver 12 may activate the first driving signal DRV1 in response to the activated feedback signal FB.

The load current meter 100 may measure the load current $I_{LOAD}$, which is provided by the switching converter 10 to the load through an output terminal. As shown in FIG. 1, the load current meter 100 may receive the first driving signal DRV1 and the second driving signal DRV2 from the switch driver 12 and generate an output signal OUT indicating a magnitude of the load current $I_{LOAD}$. The load current $I_{LOAD}$ may include an inductor current $I_L$ passing through the inductor L1 and/or current generated by discharging the output capacitor C1. Because the output capacitor C1 is charged by the inductor current $I_L$, the inductor current $I_L$ accumulated for a predetermined or alternatively, desired amount of time may be equal to the load current LOAD accumulated for the same amount of time. Accordingly, the load current meter 100 may measure the load current $I_{LOAD}$ based on the first driving signal DRV1 and the second driving signal DRV2, which include information about points in time at which the inductor current $I_L$ is generated. As used herein, the load current meter 100 may be referred to as an apparatus configured to measure the load current LOAD.

In some example embodiments, the output signal OUT generated by the load current meter 100 may be used to estimate power consumption of the load. For example, as shown in FIG. 1, when the output signal OUT is output, a power estimator included in the load or other components that consume the load current $I_{LOAD}$ may detect the magnitude of the load current $I_{LOAD}$, based on the output signal OUT. The power estimator may estimate power consumption of the load based on the detected size of the load current $I_{LOAD}$. The estimated power consumption may be utilized for a plurality of useful functions of, for example, estimating the remaining battery level, reducing or preventing the overheating of the load, or detecting an abnormal event. As used herein, the output signal OUT may be assumed to be provided to the power estimator.

In some example embodiments, the load current $I_{LOAD}$ may fluctuate within a very small range. For example, the load may be set to a power saving mode to reduce power consumption, and the load current $I_{LOAD}$ may have a significantly reduced magnitude in the power saving mode than in a normal mode. As described below with reference to the drawings, the output signal OUT may accurately indicate a load current $I_{LOAD}$ having a very small magnitude, and thus, power consumption of the load may be accurately estimated. Examples of the load current meter 100 will be described below with reference to FIGS. 2A, 2B, and 8.

The switch driver 12 may generate the first driving signal DRV1 and the second driving signal DRV2 such that the output voltage V OUT is maintained at approximately a target voltage. As shown in FIG. 1, the switch driver 12 may receive the feedback signal FB from the voltage feedback circuit 14, receive a peak signal PK from a peak current detector 16, and generate the first driving signal DRV1 and the second driving signal DRV2 based on the peak signal PK and the feedback signal FB. In some example embodiments, the switch driver 12 may include a plurality of logic gates, perform a logic operation on the peak signal PK and the feedback signal FB, and generate the first driving signal DRV1 and the second driving signal DRV2. For example, the switch driver 12 may generate a deactivated first driving signal DRV1 and an activated second driving signal DRV2 in response to an activated peak signal PK, and thus, the inductor current $I_L$ may be reduced. In addition, the switch driver 12 may generate an activated first driving signal DRV1 and a deactivated second driving signal DRV2 in response to the activated feedback signal FB, and thus, the inductor current $I_L$ may increase.

The peak current detector 16 may detect a peak of the inductor current $I_L$ passing through the inductor L and provide a peak signal PK to the switch driver 12. For example, the peak current detector 16 may detect the inductor current $I_L$, and generate an activated peak signal PK when a magnitude of the detected inductor current $I_L$ corresponds to a magnitude defined based on a first reference voltage $V_{REF1}$. The switch driver 12 may deactivate the first driving signal DRV1 in response to the activated peak signal PK, and thus, the inductor current $I_L$ may be reduced. As a result, the peak of the inductor current $I_L$ may be limited to the magnitude defined based on the first reference voltage $V_{REF1}$, and requirements of the switching converter 10, for example, electromagnetic interference (EMI) requirements, may be satisfied. In some example embodiments, for example, the first reference voltage $V_{REF1}$ may be varied by the switch driver 12, and thus, the peak of the inductor current $I_L$ may be adjusted. In some example embodiments, unlike that shown in FIG. 1, the peak current detector 16 may detect current passing through the first power switch PS1 or a peak of the current passing through the first power switch PS1 instead of the inductor current $I_L$.

Figure 2A:
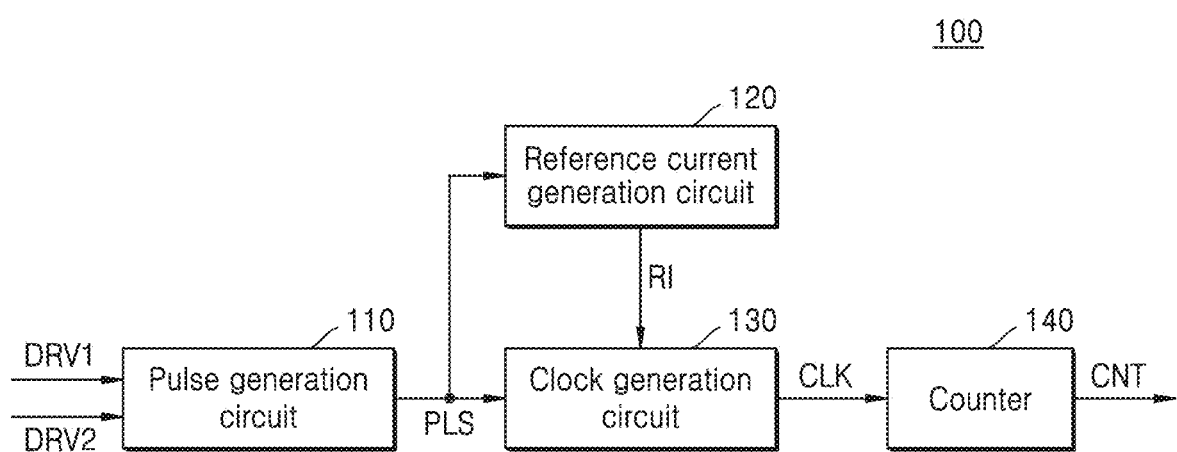
FIGS. 2A and 2B are block diagrams of a load current meter according to example embodiments.
Figure 2B:
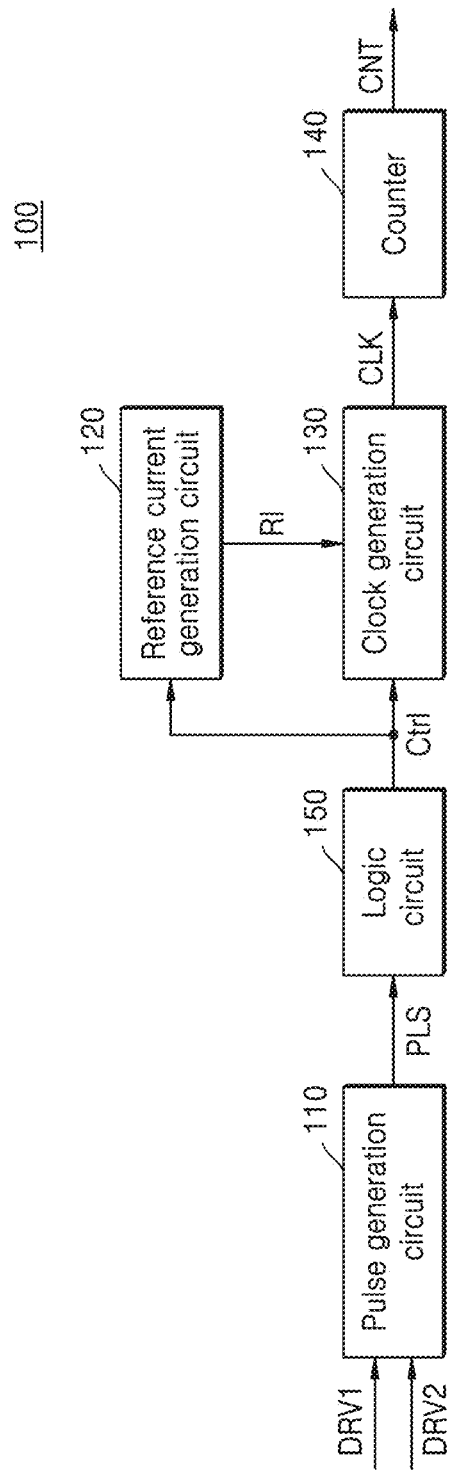

FIGS. 2A and 2B are block diagrams of a load current meter 100 according to example embodiments.

The load current meter 100 of FIG. 1A may receive a first driving signal DRV1 and a second driving signal DRV2 and generate a count value CNT indicating a magnitude of a load current $I_{LOAD}$. The load current meter 100 may include a pulse generation circuit 110, a reference current generation circuit 120, a clock generation circuit 130, and a counter 140.

The pulse generation circuit 110 may generate a control pulse (or a pulse signal) PLS based on the first driving signal DRV1 and the second driving signal DRV2. In some example embodiments, the pulse generation circuit 110 may generate the control pulse PLS having a width (or activation width), which is based on the first driving signal DRV1 and the second driving signal DRV2. As described above with reference to FIG. 1, the first driving signal DRV1 and the second driving signal DRV2 may include information about points in time at which an inductor current $I_L$ is generated. Accordingly, the control pulse PLS may include information about the inductor current $I_L$ accumulated for a predetermined or alternatively, desired amount of time. As used herein, the control pulse PLS may be assumed to be at a high level when the control pulse PLS is activated as an active-high signal, and a width of the control pulse PLS may refer to a time period during which the control pulse PLS is maintained at a high level. Examples of the pulse generation circuit 110 will be described below with reference to FIG. 3.

The reference current generation circuit 120 may supply a reference current RI to the clock generation circuit 130 based on an input voltage (supply voltage) and the control pulse PLS). The reference current generation circuit 120 may include a current sink and a current mirror to generate the reference current RI from the input voltage and further include a capacitor or a switch to control the reference current RI. Examples of the reference current generation circuit 120 will be described below with reference to FIG. 7.

The clock generation circuit 130 may generate a clock signal CLK based on the reference current RI and the control pulse PLS. The clock generation circuit 130 may charge a first capacitor in a section in which the control pulse PLS is activated, and float the first capacitor in a section in which the control pulse PLS is deactivated. The clock generation circuit 130 may charge a second capacitor in which the control pulse PLS is deactivated, and generate the clock signal CLK while discharging the second capacitor when a voltage of the second capacitor becomes equal to a voltage of the first capacitor. Examples of the clock generation circuit 130 will be described below with reference to FIG. 5.

The counter 140 may provide a counted number CNT of cycles of the clock signal CLK generated by the clock generation circuit 130. The load current meter 100 may generate an output signal indicating a magnitude of a load current based on a switching period of a switching converter and the counted number CNT of cycles of the clock signal CLK. For example, the counter 140 may count clock signals CLK from a point in time at which the control pulse PLS is activated, and be reset by storing the counted number CNT of cycles at a point in time at which the next control pulse PLS starts to be activated. The magnitude of the load current $I_{LOAD}$ may be calculated based on the counted number CNT of cycles per switching period. The load current $I_{LOAD}$ may be calculated by using the average of counted numbers CNT of cycles.

Similar to that of FIG. 2A, the load current meter 100 of FIG. 2B may include a pulse generation circuit 110, a reference current generation circuit 120, a clock generation circuit 130, and/or a counter 140 and further include a logic circuit 150.

The logic circuit 150 may include a plurality of logic gates. The logic circuit 150 may receive the control pulse PLS and generate a control signal Ctrl for controlling the reference current generation circuit 120 and the clock generation circuit 130. The logic circuit 150 may directly receive the first driving signal DRV1 and the second driving signal DRV2 instead of the control pulse PLS and generate the control signal Ctrl. The logic circuit 150 may control other components (e.g., the counter 140) included in the load current meter 100.

Figure 3:
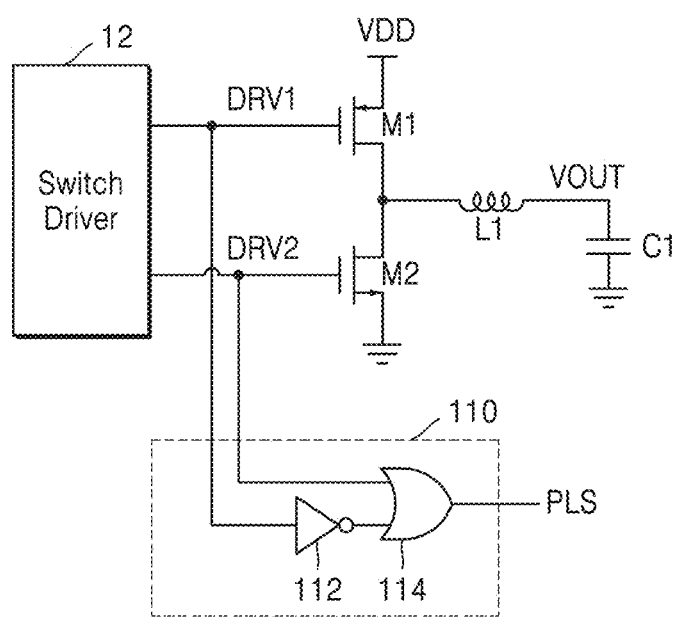
FIG. 3 is a block diagram of a pulse generation circuit (and other circuitry) according to example embodiments.

FIG. 3 is a block diagram of a pulse generation circuit 110 according to example embodiments.

Referring to FIG. 3, the pulse generation circuit 110 may generate a control pulse PLS based on a first driving signal DRV1 and a second driving signal DRV2. For example, a first transistor M1 and a second transistor M2 of the switching converter 10 may be turned on or turned off based on the first driving signal DRV1 (or a push signal) and the second driving signal DRV2 (or a pull signal), which are provided from a switch driver 12. The first transistor M1 may include a PFET as a power transistor and be turned on in response to a first driving signal DRV1 that is at a low level. Also, the second transistor M2 may include an NFET as a power transistor and be turned on in response to a second driving signal DRV2 that is at a high level. As used herein, the first driving signal DRV1 may be assumed to be an active-low signal, and the second driving signal DRV2 may be assumed to be an active-high signal.

The pulse generation circuit 110 may include logic operation circuits, such as an inverting circuit 112 and/or an OR logic gate 114. For example, the pulse generation circuit 110 may receive the first driving signal DRV1, invert the first driving signal DRV1 by using the inverting circuit 112, perform an OR operation on the inverted first driving signal DRV1 and the second driving signal DRV2 by using the OR logic gate 114, and generate the control pulse PLS.

Figure 4:
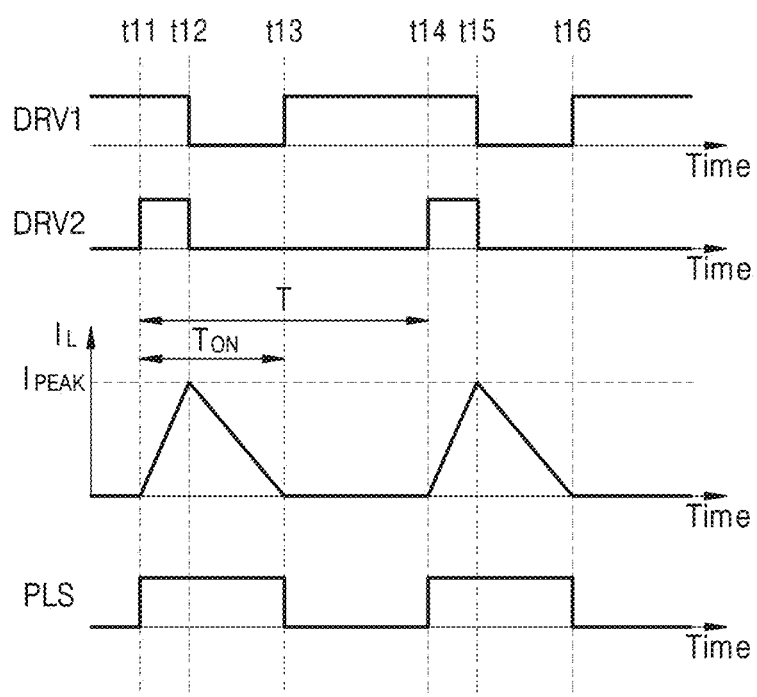
FIG. 4 is a timing diagram of an example of an operation of a switching converter according to example embodiments.

FIG. 4 is a timing diagram of an example of an operation of a switching converter according to example embodiments.

Referring to FIGS. 3 and 4, the switch driver 12 may receive an input voltage VDD and generate a first driving signal DRV1 and a second driving signal DRV2 to provide an output voltage VOUT.

At each of a point in time t11 and a point in time t14, the switch driver 12 may generate the first driving signal DRV1 that is activated. Thus, a first transistor M1 may be turned on, and the input voltage VDD may be applied by the first transistor M1 to a switch node. An inductor current $I_L$ flowing through an inductor L1 may start to increase.

At each of points in time t12 and t15, the inductor current $I_L$ may reach an upper limit, that is, a peak current $I_{PEAK}$. The switch driver 12 of FIG. 3 may generate a deactivated first driving signal DRV1 and an activated second driving signal DRV2. Accordingly, the inductor current $I_L$ may be gradually reduced due to a turned-off first transistor M1 and a turned-on second transistor M2.

At each of points in time t13 and t16, the inductor current $I_L$ may be approximately 0 (zero), and the switch driver 12 may generate a deactivated second driving signal DRV2. Thus, a second switch SW2 may be turned off, and the inductor current $I_L$ may be maintained at approximately 0. A width of each of sections between the points in time t11 to t16 may vary according a state of a load, that is, a magnitude of a load current required by the load.

A pulse generation circuit 110 may generate a control pulse PLS based on the first driving signal DRV1 and the second driving signal DRV2. For example, the pulse generation circuit 110 may receive the first driving signal DRV1, invert the first driving signal DRV1 by using an inverter operation circuit 112, perform an OR operation on the inverted first driving signal DRV1 and the second driving signal DRV2 by using an OR operation circuit 114, and generate the control pulse PLS. The pulse generation circuit 110 may generate an activated control pulse PLS from the point in time t11 to a point in time t13, and generate a deactivated control pulse PLS from the point in time t13 to the point in time t14. The pulse generation circuit 110 may generate an activated control pulse PLS from the point in time t14 to the point in time t16, and generate a deactivated control pulse PLS from the point in time t16.

Figure 5:
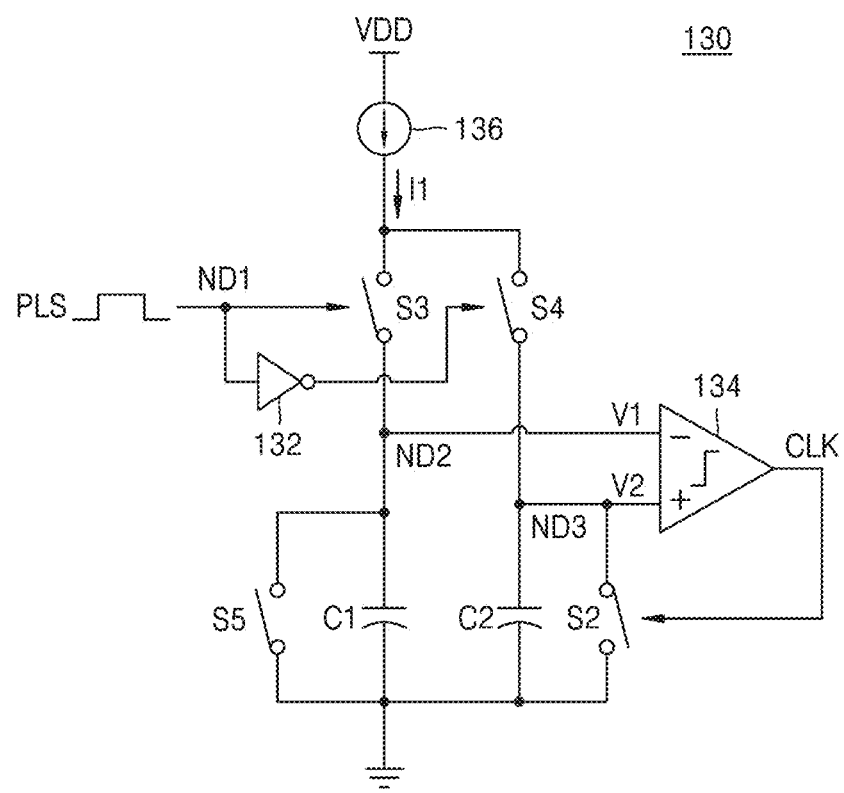
FIG. 5 is a circuit diagram of a clock generation circuit according to example embodiments.

FIG. 5 is a circuit diagram of a clock generation circuit according to example embodiments.

Referring to FIG. 5, the clock generation circuit 130 may generate a clock signal CLK based on a control pulse PLS and a reference current I1. The clock generation circuit 130 may include a current source 136, a plurality of switches (e.g., second, third and fourth switches S2, S3, and S4), an inverter operation circuit 132, a first capacitor C1, a second capacitor C2, and/or a comparator 134.

The comparator 134 may generate a clock signal CLK based on a first voltage V1 and a second voltage V2. The comparator 134 may generate the clock signal CLK, which is activated, when the second voltage V2 is higher than or equal to the first voltage V1. The clock generation circuit 130 may turn on or turn off the second switch S2 by using the generated clock signal CLK.

The current source 136 may generate a reference current I1 from a positive supply voltage VDD. The current source 136 may include a current sink and a current mirror to generate the reference current I1. The third switch S3 may be connected between the current source 136 and the first capacitor C1, and the fourth switch S4 may be connected between the current source 136 and the second capacitor C2. Also, a fifth switch S5 may be connected in parallel to the first capacitor C1, and the second switch S2 may be connected in parallel to the second capacitor C2.

The clock generation circuit 130 may turn on or turn off the third switch S3 and the fourth switch S4 by using the control pulse PLS. For example, the clock generation circuit 130 may turn on the third switch S3 and turn off the fourth switch S4 in a section in which the control pulse PLS is activated. The clock generation circuit 130 may turn off the third switch S3 and turn on the fourth switch S4 in a section in which the control pulse PLS is deactivated.

The first capacitor C1 may be connected between a second node ND2 and a ground node, while the second capacitor C2 may be connected between a third node ND3 and the ground node. To obtain a different charging rate due to the reference current I1, capacitances of the first capacitor C1 and the second capacitor C2 may be variously designed.

The comparator 134 may be connected to the third switch S3 and the first capacitor C1 at the second node ND2 and be connected to the fourth switch S4 and the second capacitor C2 at the third node ND3. The comparator 134 may compare a first voltage V1 of the second node ND2 with a second voltage V2 of the third node ND3 and generate a clock signal CLK indicating a comparison result. As used herein, a voltage (e.g., the first voltage V1) of the second node ND2 connected to the first capacitor C1 may be referred to as a voltage of the first capacitor C1, and a voltage (e.g., the second voltage V2) of the third node ND3 connected to the second capacitor C2 may be referred to as a voltage of the second capacitor C2.

When the third switch S3 is turned on, the first capacitor C1 may be charged by the reference current. When the third switch S3 is turned off, the first voltage V1 of the first capacitor C1 charged by the reference current may be maintained.

For example, before the third switch S3 is turned on and the first capacitor C1 is charged by the reference current, the clock generation circuit 130 may temporarily turn on the fifth switch S5 to put the first capacitor C1 into a discharged state.

When the fourth switch S4 is turned on, the second capacitor C2 may be charged by the reference current. When the second voltage V2 with which the second capacitor C2 is charged by the reference current becomes equal to the first voltage V1, the comparator 134 may output an activated clock signal CLK. When the second switch S2 is turned on in response to the activated clock signal CLK, the second capacitor C2 may be discharged, and the comparator 134 may output a deactivated clock signal CLK.

Figure 6A:
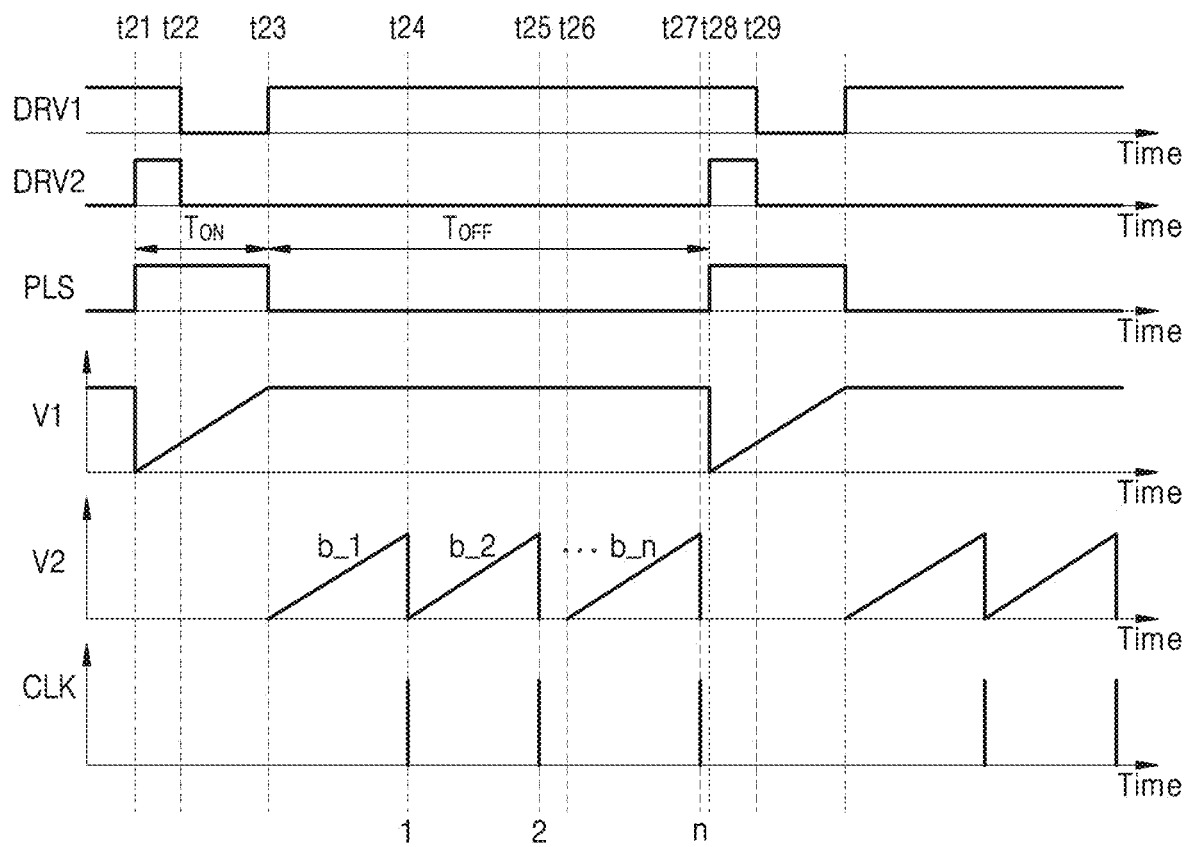
FIGS. 6A and 6B are timing diagrams of examples of operations of a switching converter, according to example embodiments.
Figure 6B:
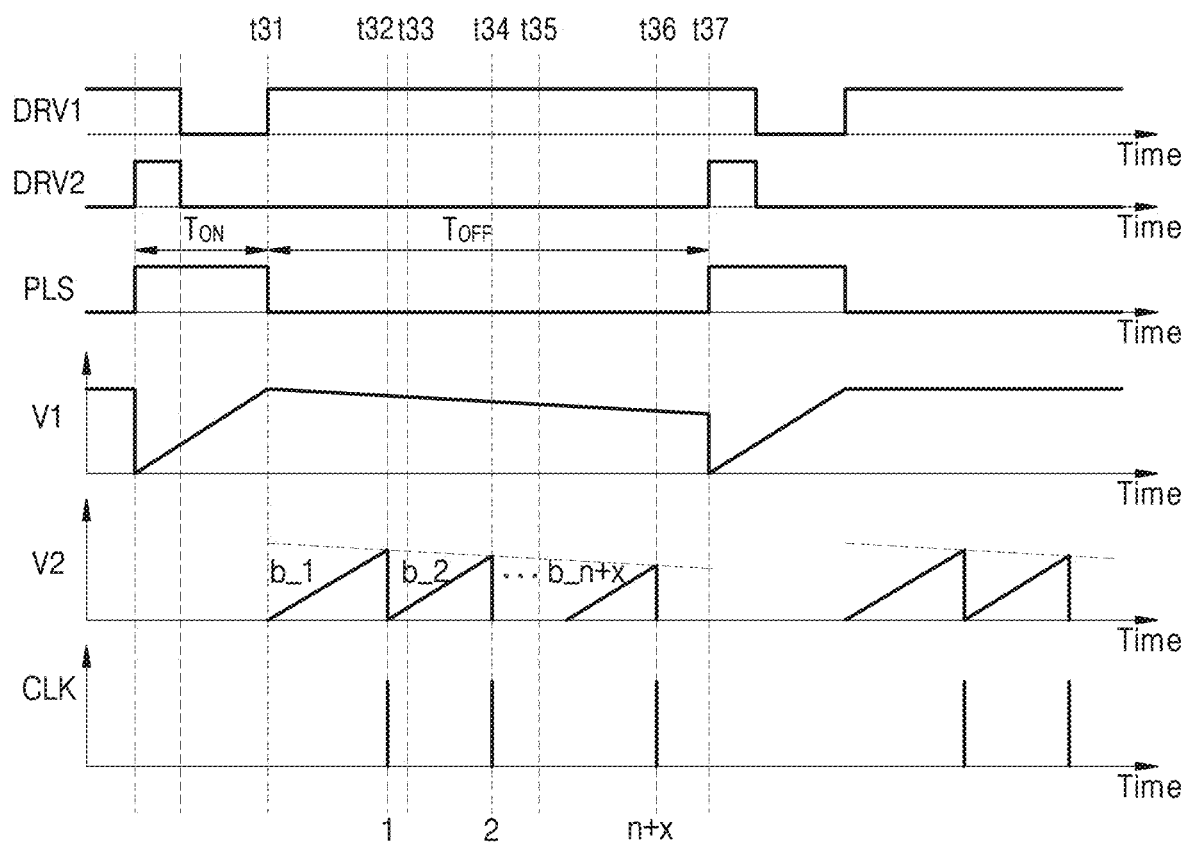

FIGS. 6A and 6B are timing diagrams of examples of an operation of a clock generation circuit according to example embodiments.

FIGS. 6A and 6B show signals of the clock generation circuit 130 of FIG. 5 over time. It is assumed that a control pulse PLS is generated by the pulse generation circuit 110 of FIG. 3.

Referring to FIGS. 5 and 6A, in a section in which the control pulse PLS is activated from a point in time t21 to a point in time t23, a first capacitor C1 may be charged by a reference current. In a section in which the control pulse PLS is deactivated from the point in time t23 to a point in time t28, the first capacitor C1 may be floated and remain charged with a first voltage V1.

A second capacitor C2 may be charged by the reference current from the point in time t23 to a point in time t24. When the first voltage V1 of the first capacitor C1 becomes equal to a second voltage V2 of the second capacitor C2 at the point in time t24, the comparator 134 may output an activated clock signal CLK. When the second switch S2 is turned on in response to the activated clock signal CLK, the second capacitor C2 may be discharged, and the second voltage V2 of the second capacitor C2 may be charged again by the reference current from the point in time t24 to a point in time t25.

Until the point in time t28 at which the control pulse PLS is deactivated, the second capacitor C2 may generate the clock signal CLK by repeating charging and discharging operations. A load current may be calculated based on the number of clock signals CLK generated during one period of a switching converter or one period of the control pulse PLS.

For example, charges $Q_C$ stored by an output terminal during one period of the switching converter or one period ($T_{ON}+T_{OFF}=T$) of the control plug PLS may be as shown in Equation 1 below.

$$Q_C = \tfrac{1}{2} * I_{peak} * T_{ON}, \quad \text{[Equation 1]}$$

wherein $T_{ON}$ may be a section in which the control pulse PLS is activated. A peak current $I_{peak}$ may be a designed value and detected by a peak current detector.

Charges $Q_D$ consumed by the load current during one period of the switching converter or one period ($T_{ON}+T_{OFF}$) of the control pulse PLS may be as shown in Equation 2 below.

$$Q_D = I_L * T = I_L * (n+1) * T_{ON}, \quad \text{[Equation 2]}$$

wherein T may denote one period of the switching converter or one period ($T_{ON}+T_{OFF}$) of the control pulse PLS, and n may denote the counted number of clock signals generated during one period.

$Q_C = Q_D$, and thus, a load current ($I_L$) may be $$\frac{1}{2(n+1)} * I_{peak}.$$

To generate a load current having a very small magnitude, one period of the switching converter may be relatively increased, and the section in which the control pulse PLS is deactivated from the point in time t23 to the point in time t28 may be increased. Referring to FIG. 6B, in a section ($T_{OFF}$) in which the first capacitor C1 is floated and remains charged with the first voltage V1, a leakage current may occur in the first capacitor C1, and thus, the first voltage V1 may be gradually reduced.

Referring to FIG. 6B, the first capacitor C1 may be charged with the first voltage V1 in the same manner as in FIG. 6A until a point in time t31. In a section in which the control pulse PLS is deactivated from the point in time t31 to a point in time t37, the first capacitor C1 may be floated, and a voltage level of the first voltage V1 may be lowered from an initial charged state over time due to the leakage current.

The second voltage V2 of the second capacitor C2 may be charged by the reference current from the point in time t31 to a point in time t32. When the first voltage V1 of the first capacitor C1 becomes equal to the second voltage V2 of the second capacitor C2 at the point in time t32, the comparator 134 may output the activated clock signal CLK. However, unlike the example embodiments of FIG. 6A, because the first voltage V1 of the first capacitor C1 has a lower voltage level due to the leakage current, a point in time at which the first voltage V1 of the first capacitor C1 becomes equal to the second voltage V2 of the second capacitor C2 may be advanced. For example, assuming that a leakage current does not occur in the first capacitor C1, the clock signal may be generated at a point in time t33. However, when the leakage current occurs in the first capacitor C1, the clock signal CLK may be generated at the point in time t32. When the second switch S2 is turned on in response to the activated clock signal CLK, the second capacitor C2 may be discharged, and the second capacitor C2 may be charged again with the second voltage V2 by the reference current from the point in time t32 to a point in time t34.

When the first voltage V1 of the first capacitor C1 becomes equal to the second voltage V2 of the second capacitor C2 at the point in time t34, the comparator 134 may output the activated clock signal CLK. Because the voltage level of the first voltage V1 of the first capacitor C1 is continuously reduced due to the leakage current, a period from the point in time t32 to the point in time t34 in which a second clock signal 2 is generated may be shorter than a period from the point in time t31 to the point in time t32 in which a first clock signal 1 is generated.

Until the point in time t37 at which the control pulse PLS is deactivated, the second capacitor C2 may generate the clock signal CLK by repeating charging and discharging operations. In some example embodiments, a period of generation of the clock signal CLK may be gradually reduced due to the leakage current caused in the first capacitor C1. The number of clock signals CLK caused during one period of the switching converter or one period of the control pulse PLS may increase more than when the leakage current does not occur, and there may be an error in the magnitude of the load current calculated based on the number of clock signals CLK. A method of compensating for the error caused by the leakage current will be described in detail with reference to FIGS. 7 to 9.

Figure 7:
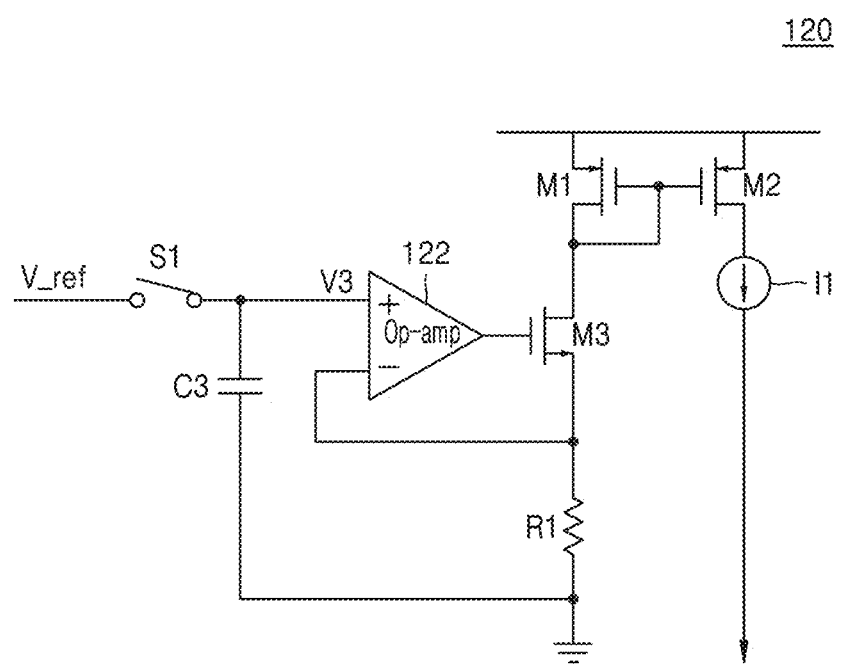
FIG. 7 is a circuit diagram of a reference current generation circuit according to example embodiments.

FIG. 7 is a circuit diagram of a reference current generation circuit 120 according to example embodiments.

Referring to FIG. 7, the reference current generation circuit 120 may have a structure configured to generate a reference current I1 from a reference voltage V_ref. For example, the reference current generation circuit 120 may include a current sink and a current mirror. The reference current generation circuit 120 may include a first switch S1 and an input compensation capacitor C3 to compensate for a leakage current generated by a clock generation circuit.

The reference current generation circuit 120 may apply the reference voltage V_ref as a third voltage V3 of an OP amplifier 122 and provide the reference current I1 based on the applied voltage. The reference current generation circuit 120 may directly apply the reference voltage V_ref to the third voltage V3 of the OP amplifier 122 by turning on the first switch S1, and charge the input compensation capacitor C3. The reference current generation circuit 120 may apply the third voltage V3 to the OP amplifier 122 by using the charged input compensation capacitor C3 by turning off the first switch S1. In some example embodiments, when a leakage current occurs in the input compensation capacitor C3, a voltage level of the third voltage V3 may be reduced, and a reference current supplied through a current source 124 may also be reduced.

Figure 8:
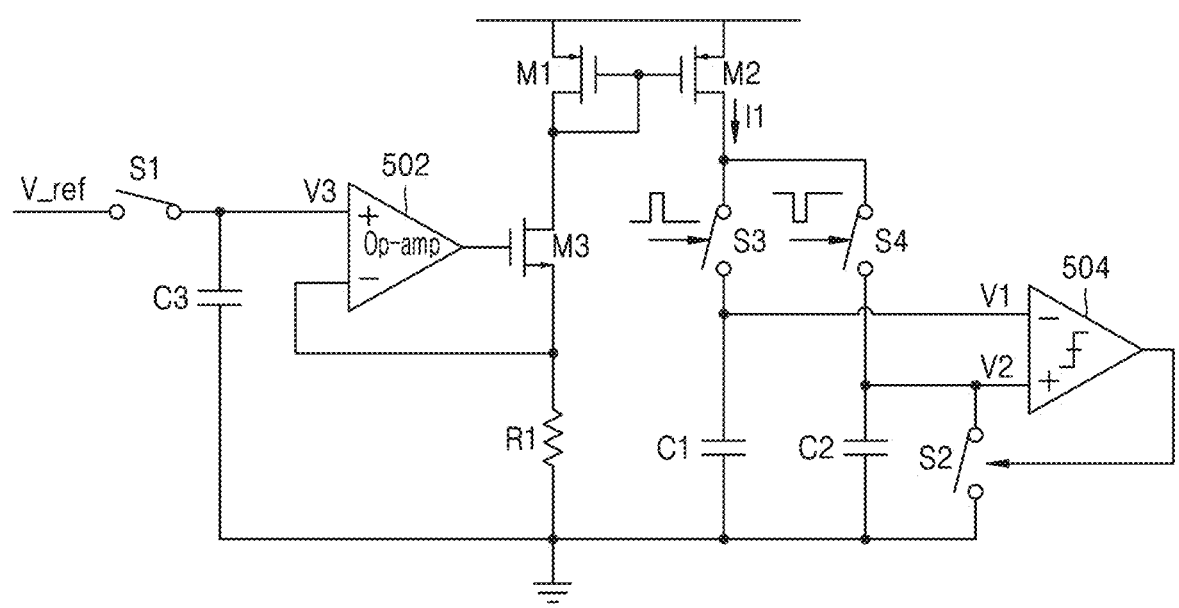
FIG. 8 is a circuit diagram of a load current meter according to example embodiments.

FIG. 8 is a circuit diagram of a load current meter 500 according to example embodiments.

Referring to FIG. 8, the load current meter 500 may control a first switch S1, which is included in a reference current generation circuit, and a third switch S3 and a fourth switch S4, which are included in a clock generation circuit, based on a control pulse generated by a pulse generation circuit.

The load current meter 500 may control an input compensation capacitor C3 to compensate for an error caused by a leakage current of a first capacitor C1. The load current meter 500 may turn off the first switch S1 for a period corresponding to a period for which the third switch S3 is turned off by deactivating the control pulse. In some example embodiments, a second voltage applied to the comparator 504 may slowly increase due to a leakage current of the input compensation capacitor C3 as much as a first voltage V1 applied to a comparator 504 is reduced due to the leakage current of the first capacitor C1. Thus, an error caused during the measuring of a load current may be reduced.

For example, the first switch S1 and the third switch S3 may be controlled in the same state based on the same signal, and the first switch S1 may be turned on or off faster than the third switch S3 considering time at which a reference current I1 is generated based on a third voltage V3.

Figure 9:
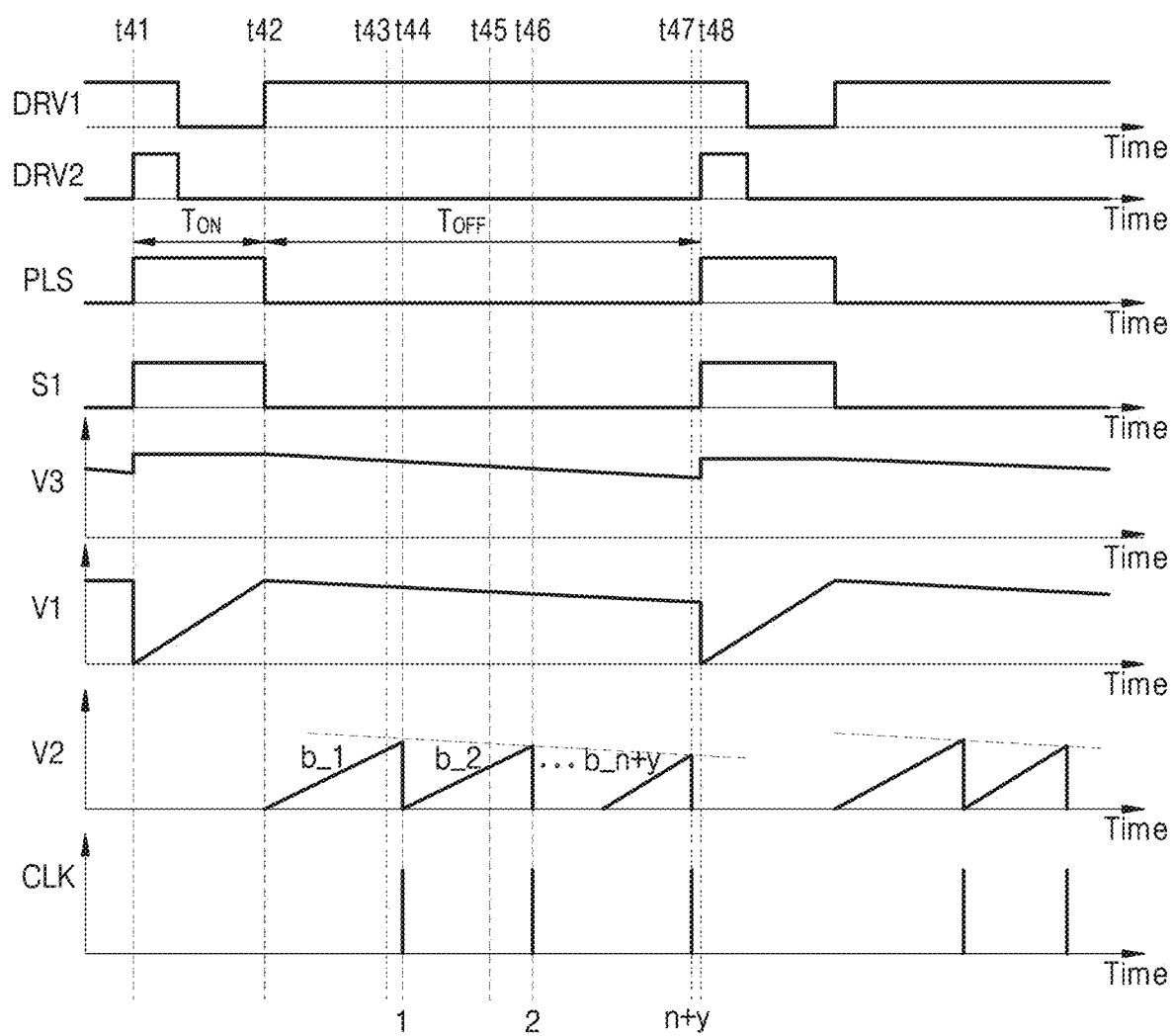
FIG. 9 is a timing diagram of an example of an operation of a switching converter according to example embodiments.

FIG. 9 is a timing diagram of an example of an operation of a switching converter according to example embodiments.

Referring to FIGS. 8 and 9, the load current meter 500 may generate a reference current I1 based on a third voltage V3 by using a current mirror.

In a section in which a control pulse PLS is activated from a point in time t41 to a point in time t42, both a first switch S1 and a third switch S3 may be turned on, and a first capacitor C1 may be charged by the reference current I1. Because the first switch S1 remains turned on, the third voltage V3 may be maintained at a constant voltage level based on a reference voltage V_ref.

From the point in time t42 to a point in time t44 in a section in which the control pulse PLS is deactivated, both the first switch S1 and the third switch S3 may be turned off, and a fourth switch S4 may be turned on. When the fourth switch S4 is turned on, a second capacitor C2 may be charged by the reference current I1. Because the first switch S1 remains turned off, the third voltage V3 may be supplied by an input compensation capacitor C3, and a voltage level of the third voltage V3 may be gradually reduced due to a leakage current, and the reference current I1 may also be gradually reduced. Accordingly, because a rate at which the second capacitor C2 is charged is reduced as much as a first voltage V1 of the first capacitor C1 is reduced, an error may be reduced during the generation of a clock signal CLK, as compared to example embodiments in which a leakage current occurs only in the first capacitor C1.

When the number of clock signals CLK generated during one period of the switching converter or one period of the control pulse PLS is measured, an error caused by causing a leakage current caused by the leakage current generated in the first capacitor C1 may be compensated for by using the input compensation capacitor C3. For example, by reducing the third voltage V3 at a rate corresponding to a reduction in the first voltage V1 due to the leakage current, an error caused during the measuring of a load current may be reduced.

Figure 10:
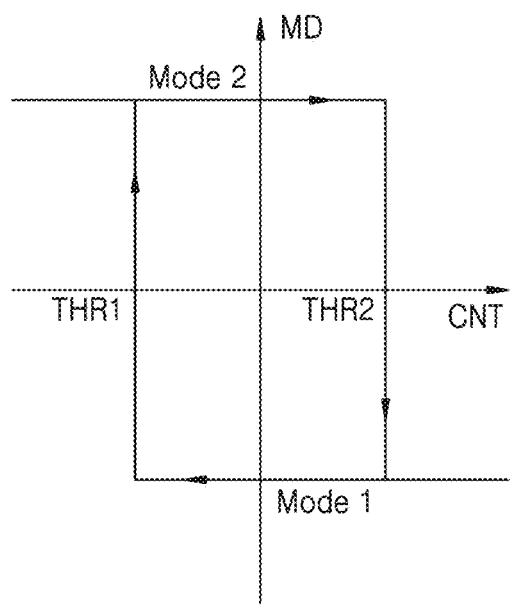
FIG. 10 is a graph showing the switching of a measurement mode of a load current meter, according to example embodiments.

FIG. 10 is a graph showing the switching of a measurement mode of a load current meter 100, according to example embodiments.

For example, the graph of FIG. 10 shows a hysteresis loop, which occurs during the switching of the measurement mode of the load current meter 100.

As described above with reference to the drawings, the load current meter 100 may be set to a first mode when a load current $I_{LOAD}$ is small, and may be set to a second mode when the load current $I_{LOAD}$ is large. For example, the load current $I_{LOAD}$ may be reduced as a count CNT increases, and increase as the count CNT is reduced.

To reduce or prevent errors and inaccuracy due to frequent switching of the measurement mode, the load current meter 100 may provide hysteresis to the switching of the measurement mode. For example, as shown in FIG. 10, the load current meter 100 may be set to the second mode when the count CNT is lower than a first threshold value THR1, and may be set to the first mode when the count CNT is higher than a second threshold value THR2. Herein the second threshold value THR2 may be higher than the first threshold value THR1 (THR2>THR1).

For example, when the load current is very small, a switching period of a switching converter configured to supply the load current $I_{LOAD}$ may become relatively long, and an error caused by a leakage current may further increase. Thus, the load current meter 100 may operate in the first mode including an operation for compensating for the leakage current. When the load current is larger than or equal to a preset current level, the switching period of the switching converter configured to supply the load current $I_{LOAD}$ may become relatively short. In some example embodiments, the load current meter 100 may operate in the second mode in which the effect of the leakage current is not considered.

Figure 11:
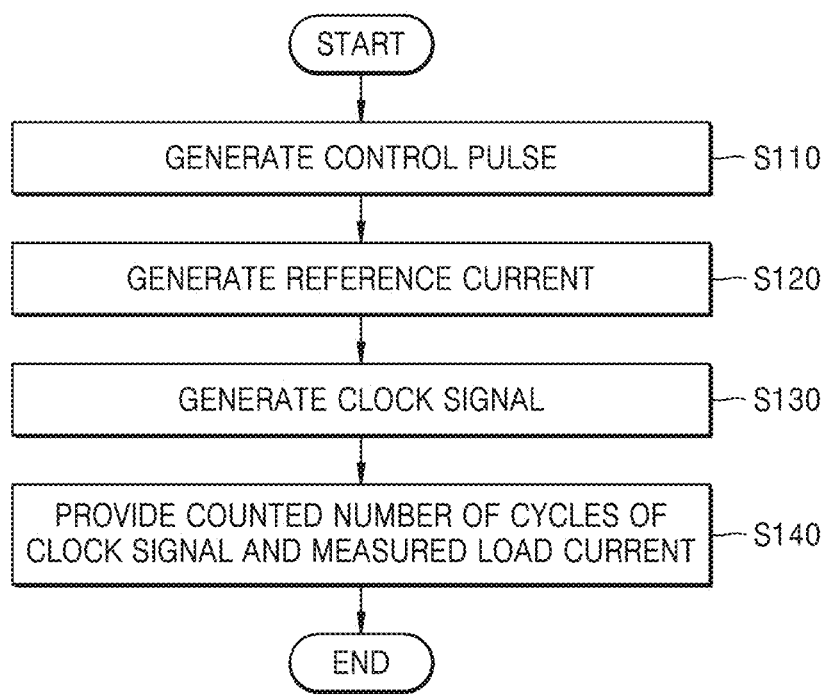
FIG. 11 is a flowchart of a method of measuring a load current, according to example embodiments.

FIG. 11 is a flowchart of a method of measuring a load current, according to example embodiments.

Referring to FIGS. 1, 2A, 2B, and 11, the pulse generation circuit 110 may generate a control pulse, based on a power switch driving signal of the switching converter 10 (S110). The switching converter 10 may adjust a period of the power switch driving signal to control a load current or an output voltage. The control pulse may be activated in a section in which a first driving signal or a second driving signal is activated.

The reference current generation circuit 120 may generate a reference current based on the control pulse (S120). The generation of the reference current may include adjusting the reference current to compensate for a leakage current caused during the generation of a clock signal during a switching period.

The generation of the reference current may further include generating the reference current based on a reference voltage, charging an input compensation capacitor with the reference voltage in a section in which the control pulse is activated, and generating the reference voltage based on charges stored in the input compensation capacitor after the section in which the control pulse is activated.

The generation of the reference current may further include turning on a first switch configured such that one end of the first switch receives an input current and the other end thereof is connected to the input compensation capacitor in the section in which the control pulse is activated and turning off the first switch such that a node at which the input compensation capacitor is connected to the first switch is floated in a section in which the control pulse is deactivated.

The clock generation circuit 130 may generate the clock signal based on the control pulse and the reference current (S130).

The generation of the clock signal may further include charging a first capacitor by the reference current in the section in which the control pulse is activated, floating the first capacitor in the section in which the control pulse is deactivated, and charging a second capacitor by the reference current.

The generation of the clock signal may further include generating an activated clock signal when a second voltage of the second capacitor becomes higher than a first voltage of the first capacitor and discharging the second capacitor in response to the activated clock signal.

The counter 140 may count the number of cycles of the clock signal during the switching period of the switching converter 10 (S140). The counting of the number of cycles of the clock signal may further include generating an output signal indicating a magnitude of a load current based on the switching period of the switching converter 10 and the counted number of cycles of the clock signal.

The load current meter 100 may convert information about the load current into digital information based on the switching period of the switching converter 10 or the counted number of cycles of the clock signal and provide the digital information to a user.

Figure 12:
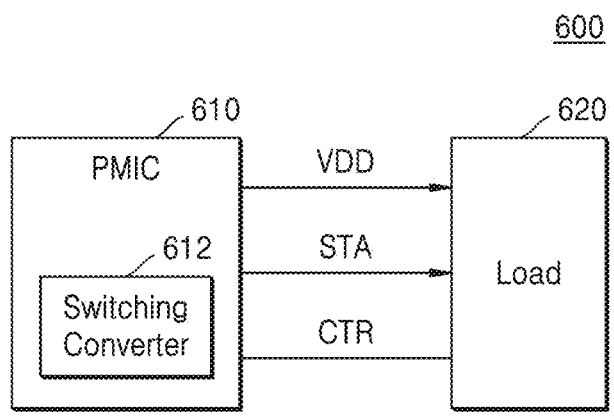
FIG. 12 is a block diagram of a system according to example embodiments.

FIG. 12 is a block diagram of a system 600 according to example embodiments.

As shown in FIG. 12, the system 600 may include a power management integrated circuit (PMIC) 610 and/or a load 620.

The system 600 may refer to a system configured to provide an arbitrary function by performing an operation due to power consumption of the load 620. For example, the system 600 may be a computing system (e.g., a personal computer, a server, a mobile phone, and a wearable device), a vehicle (e.g., a car, a ship, and an electric kickboard), or a sub-system included in the above-described systems.

The PMIC 610 may include a switching converter 612, which is as described above with reference to the drawings, and provide a positive supply voltage VDD generated by the switching converter 612 to the load 620. In addition, the PMIC 610 may provide, to the load 620, a status signal STA including information about power consumption of the load 620. For example, as described above with reference to the drawings, the switching converter 612 may generate an output signal corresponding to a magnitude of a load current provided to the load 620, and the PMIC 610 may provide the output signal or a status signal STA including information about a magnitude of a load current detected based on the output signal, to the load 620.

The load 620 may receive the positive supply voltage VDD from the PMIC 610 and operate based on the positive supply voltage VDD. In addition, the load 620 may receive the status signal STA from the PMIC 610, and estimate or detect power consumption of the load 620, based on the status signal STA. As described above with reference to the drawings, the load 620 may accurately estimate or detect power consumption due to an accurately measured load current. The load 620 may control the PMIC 610 by using a control signal CTR. For example, the load 620 may transmit the control signal CTR indicating a magnitude of the positive supply voltage VDD and an entry into or release from a power saving mode to the PMIC 610. The PMIC 610 may adjust the magnitude of the positive supply voltage VDD based on the control signal CTR and/or stop or restart the generation of the positive supply voltage VDD.

Figure 13:
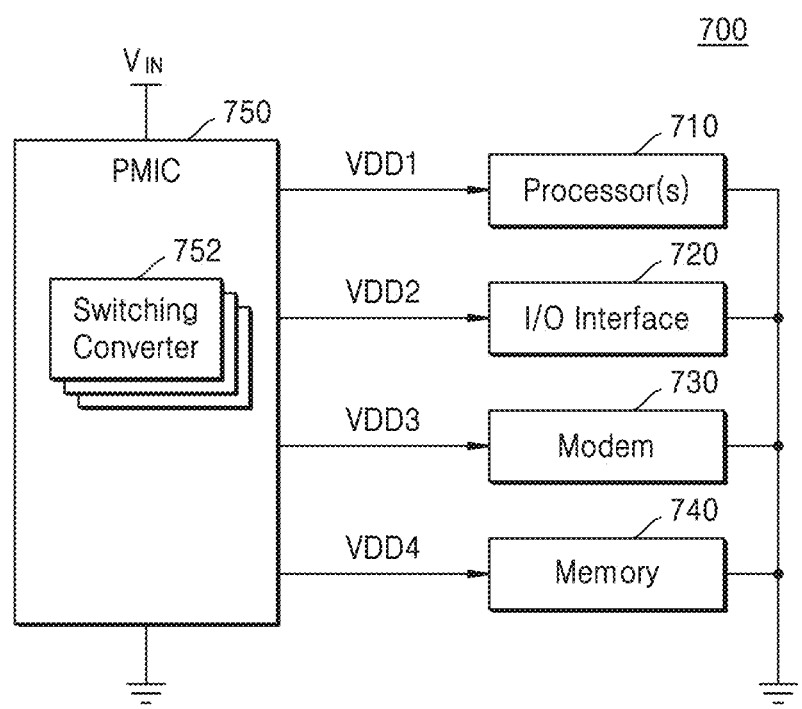
FIG. 13 is a block diagram of a system according to example embodiments.

FIG. 13 is a block diagram of a system 700 according to example embodiments.

In some example embodiments, the system 700 may be an integrated circuit (IC) included in one semiconductor package, such as a System-on-Chip (SoC). In some example embodiments, the system 700 may include a PCB and semiconductor packages mounted on the PCB. As shown in FIG. 13, the system 700 may include at least one processor 710, an input/output (I/O) interface 720, a modem 730, a memory 740, and/or a PMIC 750.

The at least one processor 710, the I/O interface 720, the modem 730, and the memory 740 may respectively operate based on pieces of power provided by first to fourth positive supply voltages VDD1 to VDD4 supplied from the PMIC 750. For example, the at least one processor 710 may execute a series of instructions or process signals based on the first positive supply voltage VDD1. The I/O interface 720 may process an input signal received from the outside of the system 700, based on the second positive supply voltage VDD2, and generate an output signal to be provided to the outside of the system 700. The modem 730 may process a received signal through a communication channel or generate a signal to be transmitted through the communication channel, based on the third positive supply voltage VDD3. The memory 740 may store data based on the fourth supply voltage VDD4, and include a volatile memory device, such as dynamic random access memory (DRAM) and static RAM (SRAM), and/or a non-volatile memory device, such as flash memory and resistive RAM (RRAM).

The PMIC 750 may include a plurality of switching converters 752, each of which may generate one of the first to fourth positive supply voltages VDD to VDD4 from an input voltage VIN. As described above with reference to the drawings, each of the plurality of switching converters 752 may more accurately measure even a load current having a smaller magnitude, which is provided thereto.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:

1. A switching converter configured to generate an output voltage from an input voltage, the switching converter comprising:
   an inductor and an output capacitor connected to an output node from which the output voltage is generated;
   a first power switch and a second power switch configured to provide an inductor current to the inductor;
   a switch driver configured to generate a power switch driving signal for controlling the first power switch and the second power switch; and a load current meter configured to measure a load current provided to a load of the switching converter, wherein the load current meter is configured to generate a control pulse based on the power switch driving signal of the switching converter, is configured to generate a reference current based on the control pulse, is configured to control the reference current to compensate for a leakage current generated in a clock generation circuit, is configured to generate a clock signal corresponding to the load current based on the control pulse and the reference current, and is configured to count a number of cycles of the clock signal during a switching period of the switching converter, and wherein the control pulse is activated for a period in which the first power switch or the second power switch of the switching converter is turned on.

2. A method of measuring a load current to be provided to a load of a switching converter, the method comprising:

generating a control pulse based on a power switch driving signal of the switching converter;

generating a reference current based on the control pulse;

generating a clock signal based on the control pulse and the reference current; and counting a number of cycles of the clock signal during a switching period of the switching converter, wherein the generating of the reference current comprises adjusting the reference current to compensate for a leakage current caused in the generating of the clock signal during the switching period, and wherein the generating of the reference current further comprises generating the reference current based on a reference voltage, charging an input compensation capacitor with the reference voltage in a section in which the control pulse is activated, and generating the reference voltage based on charges stored in the input compensation capacitor after the section in which the control pulse is activated.

3. The method of claim 2, wherein the generating of the reference current further comprises turning on a first switch configured such that one end of the first switch receives an input current and the other end thereof is connected to the input compensation capacitor in the section in which the control pulse is activated, and turning off the first switch such that a node at which the input compensation capacitor is connected to the first switch is floated in a section in which the control pulse is deactivated.

4. The method of claim 2, wherein the counting of the number of cycles of the clock signal further comprises generating an output signal indicating a magnitude of the load current based on the switching period of the switching converter and the counted number of cycles of the clock signal.

5. A method of measuring a load current to be provided to a load of a switching converter, the method comprising:

generating a control pulse based on a power switch driving signal of the switching converter;

generating a reference current based on the control pulse;

generating a clock signal based on the control pulse and the reference current; and counting a number of cycles of the clock signal during a switching period of the switching converter, wherein the generating of the reference current comprises adjusting the reference current to compensate for a leakage current caused in the generating of the clock signal during the switching period, wherein the generating of the clock signal further comprises charging a first capacitor by the reference current in a section in which the control pulse is activated, floating the first capacitor in a section in which the control pulse is deactivated, and charging a second capacitor by the reference current.

6. The method of claim 5, wherein the generating of the clock signal further comprises:

generating an activated clock signal when a second voltage of the second capacitor is higher than a first voltage of the first capacitor; and discharging the second capacitor in response to the activated clock signal.

\* \* \* \* \*